United States Patent [19]

Funo et al.

[11] Patent Number: 4,756,400
[45] Date of Patent: Jul. 12, 1988

[54] PRODUCT SUPPLY SYSTEM FOR ACCUMULATION PACKAGING MACHINE

[75] Inventors: Masao Funo, Kurihashi; Hayao Maeda, Kitamoto, both of Japan

[73] Assignee: The Japan Tobacco Salt Public Corporation, Tokyo, Japan

[21] Appl. No.: 35,242

[22] Filed: Apr. 6, 1987

Related U.S. Application Data

[63] Continuation of Ser. No. 705,200, Feb. 25, 1985, abandoned.

[30] Foreign Application Priority Data

Jul. 17, 1984 [JP] Japan ............................. 59-146892

[51] Int. Cl.$^4$ .............................................. B65G 47/26
[52] U.S. Cl. .................................... 198/425; 198/429; 198/430; 198/461; 198/463.4; 198/468.11; 198/626
[58] Field of Search ............... 198/347, 425, 429, 430, 198/461, 462, 463.4, 468.8, 468.11, 626

[56] References Cited

U.S. PATENT DOCUMENTS

| | | | |
|---|---|---|---|
| 1,510,717 | 10/1924 | Straight | 198/430 |
| 2,180,163 | 11/1939 | Milmoe et al. | 198/468.8 |
| 3,407,916 | 10/1968 | Engeler | 198/429 |
| 3,525,097 | 8/1970 | Maulini | 198/429 |
| 3,938,650 | 2/1976 | Holt | 198/461 X |
| 4,029,198 | 6/1977 | Lingl, Jr. | 198/425 |
| 4,190,146 | 2/1980 | Knuchel | 198/461 X |
| 4,558,777 | 12/1985 | Francioni | 198/461 |
| 4,589,812 | 5/1986 | Meives et al. | 198/430 X |

FOREIGN PATENT DOCUMENTS

| | | | |
|---|---|---|---|
| 2508841 | 9/1976 | Fed. Rep. of Germany | 198/468.8 |
| 941490 | 11/1963 | United Kingdom | 198/429 |

Primary Examiner—Robert J. Spar
Assistant Examiner—Lyle K. Kimms
Attorney, Agent, or Firm—Murray and Whisenhunt

[57] ABSTRACT

A product supply system for an accumulation packaging machine which may permit a high speed operation of a product discharge section and smoothly supply a product to the accumulation packaging device with a row arrangement of the product retained. The product supply system comprises a push conveyance line provided between the product discharge section and the accumulation packaging machine through an acceleration feeding device, and a product separating device and a product retaining device each provided in the push conveyance line and adapted to be interlocked with the accumulation packaging machine, wherein a product feed velocity of the acceleration feeding device is higher than that of the product discharge section.

6 Claims, 8 Drawing Sheets

PRODUCT SUPPLY SYSTEM FOR ACCUMULATION PACKAGING MACHINE

This application is a continuation of Ser. No. 705,200 filed Feb. 25, 1985, now abandoned.

BACKGROUND OF THE INVENTION

This invention relates to a product supply system to be arranged between a product discharge section and an accumulation packaging machine, wherein a plurality of products intermittently discharged from the product discharge section are packaged in a lump.

Figure 6A:
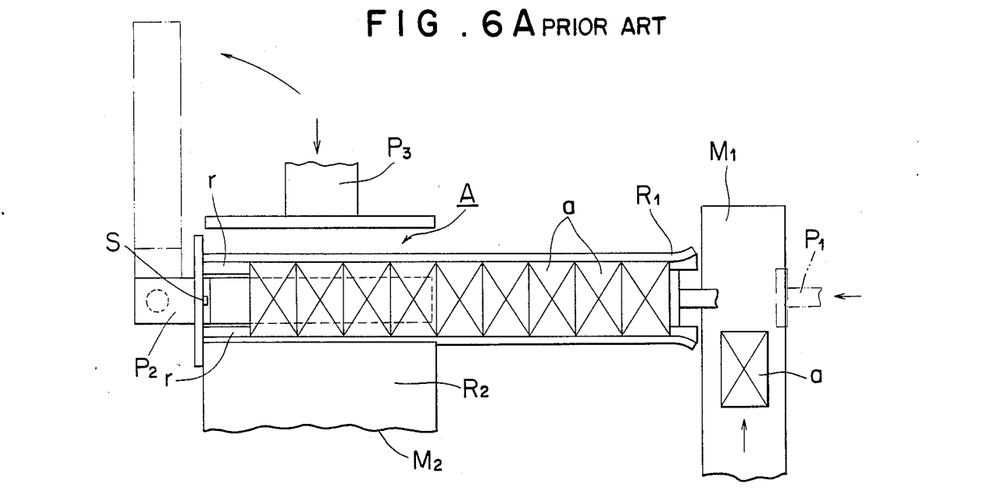
FIG. 6A is a plan view of a product supply system in the prior art.
Figure 6B:
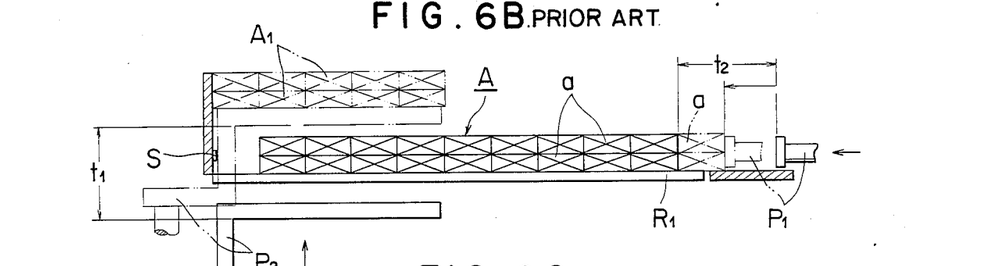
FIG. 6B is a longitudinally vertical sectional view of FIG. 6A.
Figure 6C:
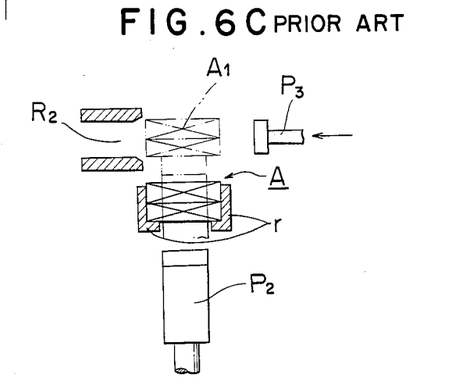
FIG. 6C is a laterally vertical sectional view of FIG. 6A.

As shown in FIGS. 6A and 6B, a conventional product supply system for an accumulation packaging machine is of an intermittent push type where a product a is intermittently discharged from a product discharge section M1 connected to a continuously operative packaging machine in a previous stage for example, and is then pushed by a pusher P1 every discharge action to a push conveyance line R1 leading to an accumulation packaging machine M2 in a subsequent stage. There is provided at a final end of the push conveyance line R1 a sensor S for detecting a leading end of a row A of the product as supplied in an intermittent push manner. Upon detection of the leading product a by the sensor S, a product separating device (elevation and swiveling plate) P2 for separating a desired row A1 of the product in the row A of the product is elevated according to a detection signal from a waiting position under the push conveyance line R1 between both conveyor plates r to raise the product row A1 consisting of m-steps and n-rows, or two-steps and five-rows in this case. At an upper limit of elevation, a pusher P3 is projected to feed the product row A1 to a conveyance line R2 leading to the accumulation packaging machine M2, and is then retracted. At the same time, the elevation and swiveling plate P2 is horizontally swiveled at an angle of 90 degrees, and is then lowered. At a lower limit of the plate P2, the plate P2 is horizontally swiveled at an angle of 90 degrees in the reverse direction to be returned to an original position under the push conveyance line R1. On the other hand, the product row A1 of two-steps and five-rows on the conveyance line R2 is accumulated and packaged.

In such a constitution as above, assuming that a time t1 is a period from a time when the sensor S detects the leading product a and the product separating device (elevation and swiveling plate) P2 starts elevating to a time when a lower surface of the product separating device (elevation and swiveling plate) P2 is raised to a height where the product a is not interfered, and that a time t2 is a period from a time when the pusher P1 completely pushes out the product a or the product row A to a time when the pusher P1 starts pushing the next product row A (pusher return time t2), it is required to set the times t1 and t2 in the relation of $t1 < t2$.

In the event that the relation is not satisfied, during elevation of the product row A1 containing (m×n) products by means of the elevation and swiveling plate P2, the product in (n+1) row will collide with a tip end of the elevation and swiveling plate P2, thereby hindering smooth operation. Assuming that a time required for feeding one product is t3, a period of motion of the product a, that is, a supply cycle of the product discharge section M1 is $t2 + t3$.

In the prior art system as mentioned above, the product separating device (elevation and swiveling plate) P2 is operated through a cam mechanism in such a manner as to engage and dissengage a clutch and brake mechanism under continuous running condition of a motor in the accumulation packaging machine in the subsequent step.

Accordingly, operation of the product separating device (elevation and swiveling plate) P2 is restricted by the mechanism of such kinds of drive members (motor, clutch and brake), and a high speed operation is limited. Further, when the product discharge section is operated at a high speed, the above-mentioned relation of $t1 < t2$ cannot be maintained.

Furthermore, it is disadvantageous that a detecting timing of the sensor S tends to be inaccurate because of variation in size of the product (e.g., cigarette package) as supplied from the product discharge section, and in case of conveyance of several stepped products, or double stepped products for example, a trouble such as breakage of the steps tends to occur.

SUMMARY OF THE INVENTION

It is an object of the present invention to provide a product supply system for an accumulation packaging machine which may permit a highspeed operation of a product discharge section.

It is another object of the present invention to provide a product supply system for an accumulation packaging machine which may smoothly supply a product to the accumulation packaging machine with a row arrangement of the product retained.

According to the present invention, there is provided a product supply system for an accumulation packaging machine comprising a push conveyance line provided between a product discharge section and said accumulation packaging machine through an acceleration feeding device, and a product separating device and a product retaining device each provided in said push conveyance line and adapted to be interlocked with said accumulation packaging machine, wherein a product feed velocity of said acceleration feeding device is higher than that of said product discharge section.

In other words, the acceleration feeding device is additionally arranged in the push conveyance line to satisfy a relation of $t1 < t2 + \alpha$, wherein $\alpha$ is an amplified amount, thereby attaining a high speed operation of the product discharge section and smoothly supplying a product to the accumulation packaging machine in the subsequent stage. Further, there is provided in the push conveyance line the product retaining device for temporarily holding the product row antecedent to the product row to be separated by the product separating device, thereby retaining row arrangement of the product during operation of the product separating device.

These and other object and features of the present invention will be apparent from the following detailed description and appended claims when taken with the accompaning drawings.

DETAILED DESCRIPTION OF THE PREFERRED EMBODIMENTS

Referring to FIGS. 1 to 5 in which same parts as in FIG. 6 are designated by the same reference numerals, in a push conveyance line R1 between a product discharge section M1 and an accumulation packaging machine M2, there are provided an acceleration feeding device X comprising a pair of endless conveyor belts 1 between the push conveyance line R1 and a pusher P1 and a product retaining device Y arranged adjacent to the acceleration feeding device X on a side of the push conveyance line R1.

Figure 1:
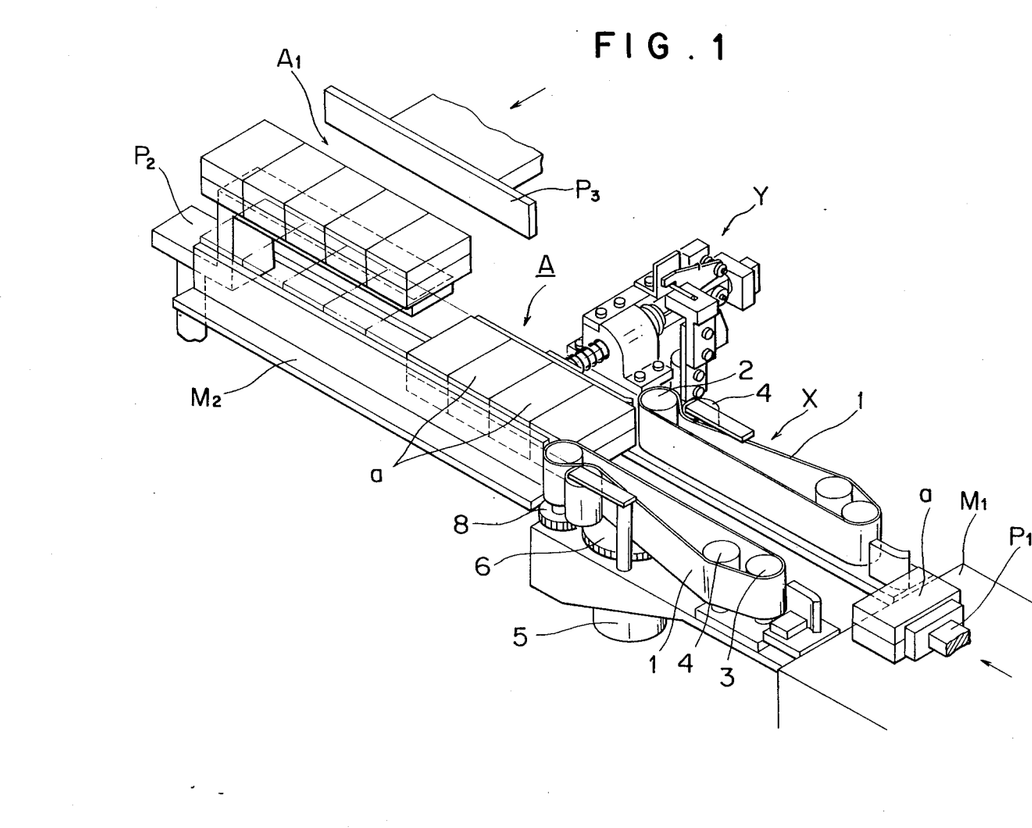
FIG. 1 is a schematic perspective view of the product supply system of the present invention.
Figure 2:
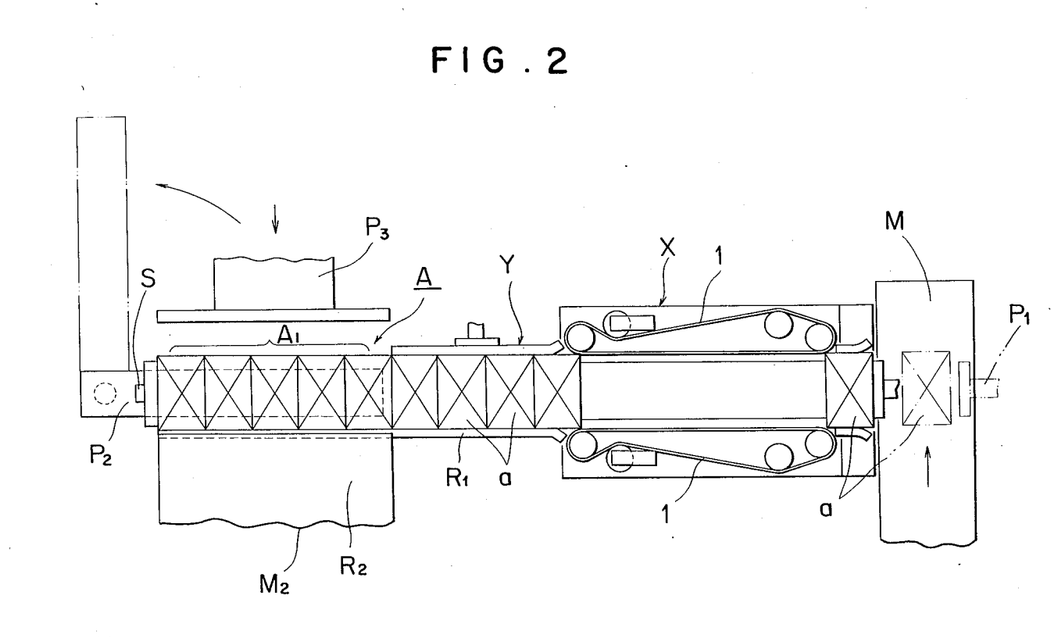
FIG. 2 is a plan view of FIG. 1.

The acceleration feeding device X has a product feeding speed higher than that of the pusher P1 at the product discharge section M1. A product a to be intermittently discharged from the product discharge section M1 is fed into the acceleration feeding device X by the pusher P1. Then, the product A is interposed between the pair of endless belts 1 to be accelerated and is sequentially pushed onto the push conveyance line R1. In the push conveyance line R1, the product a is conveyed in an intermittent push manner, and when a sensor S detects the leading product a, a product separating device (elevation and swiveling plate) P2 starts operation to raise a predetermined row A1 of the product.

Figure 3:
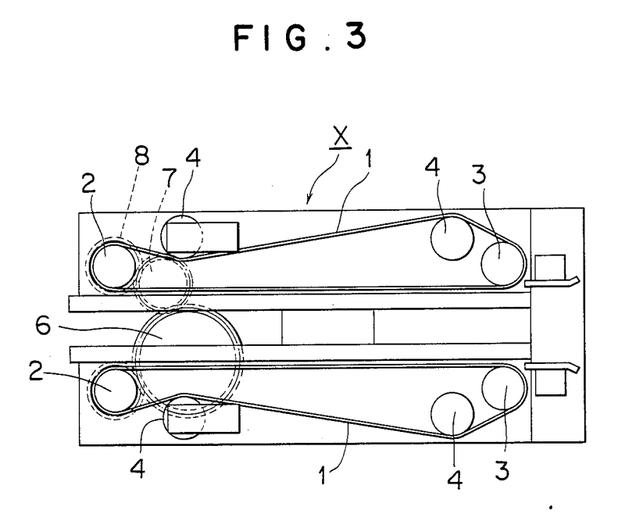
FIG. 3 is a plan view of the acceleration feeding device according to the present invention.
Figure 4:
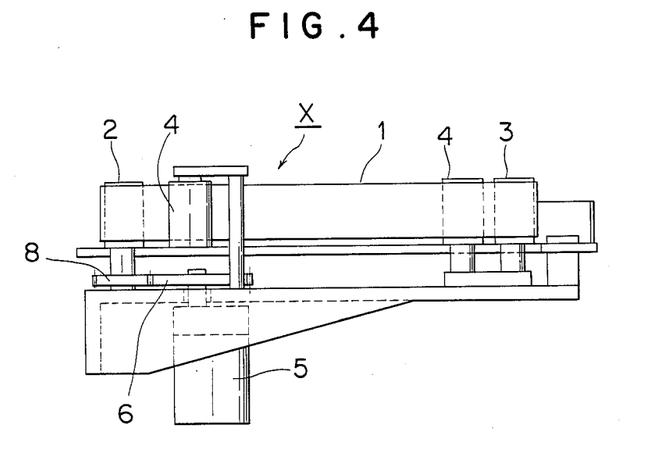
FIG. 4 is a side view of FIG. 3.

The pair of endless conveyor belts 1 of the acceleration feeding device X are stretched between drive rollers 2 and driven rollers 3 via guide rollers 4. A motive power is transmitted from motors 5 through gears 6, 7 and 8 to the drive rollers 2.

If an average discharge velocity V1 of the product discharge section M1, a velocity V2 of the acceleration feeding device X and a width W of the product a are supposed, a product discharge time $t3=W/V1$, while a product discharge time t4 by the acceleration feeding device X is $t4=W/V2$. Due to V2/V1, there is created difference between the product discharge time t3 by the product discharge section M1 and the product discharge time t4 by the acceleration feeding device X. The difference $T=t3-t4$ corresponds to the amplified amount $\alpha$ which is previously mentioned. The difference T or $\alpha$ may be added to a return time t2 of the pusher P1 at the product discharge section M1, and as a result, it is possible to enhance a transaction capacity of the accumulation packaging machine in order to cope with a high speed operation of the product discharge section by determining the velocity V2 of the acceleration feeding device X so as to satisfy the relation of $t1<t2+\alpha$.

Figure 5:
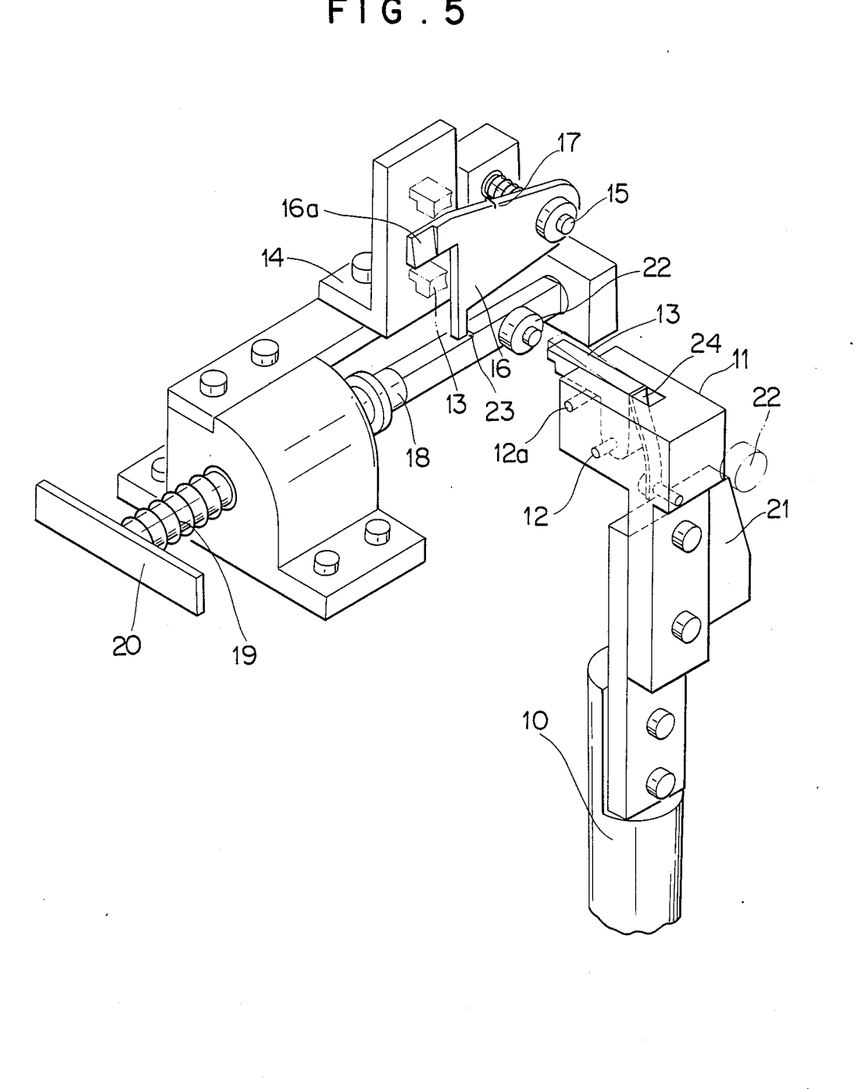
FIG. 5 is a perspective view of the product retaining device according to the present invention.

The product retaining device Y is provided with a driven member 10 which is designed to be moved upwardly and downwardly by a cam mechanism (not shown) in interlocking relation with operation of the accumulation packaging machine M2. When the driven member 10 is elevated, a rocking pawl 13 pivoted by a pin 12 to a forked support 11 is elevated in engagement with a stop pin 12a to rotate an engagement pawl 16 pivoted by a shaft 15 to a retaining body 14 against a spring 17 in a clockwise direction as seen in FIG. 5. As a result, the engagement pawl 16 is released, and a support shaft 18 is forwardly moved in a moment by a spring 19 to urge a retaining plate 20 which in turn abuts against a row A of the product to retain row arrangement of the product.

Then, upon further upward movement of the driven member 10, a plate cam 21 is brought into engagement with a cam follower 22 of the support shaft 18 to retract the support shaft 18 and the retaining plate 20. Such a retracted position is retained by the engagement pawl 16 engaged with an engagement portion 23 of the support shaft 18.

When the driven member 10 is lowered, the rocking pawl 13 is upwardly rotated against a leaf spring 24, and rides over a slant surface 16a of the engagement pawl 16 to be lowered to its lowermost position.

Figure 7A:
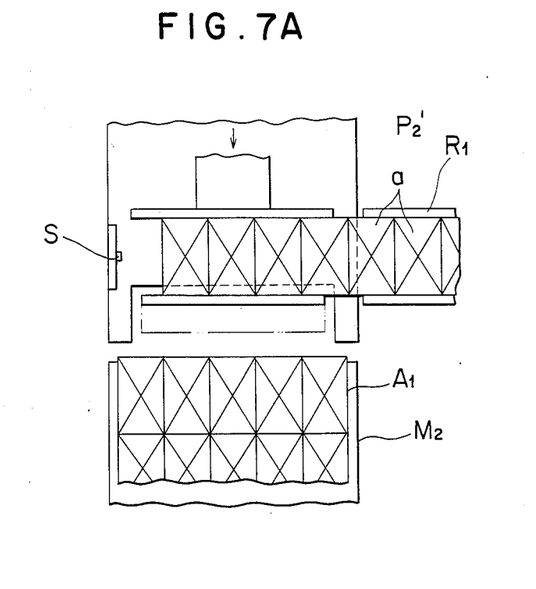
FIGS. 7A and 7B are a plan view and a sectional view of the product separating device of a modified embodiment of the present invention.
Figure 7B:
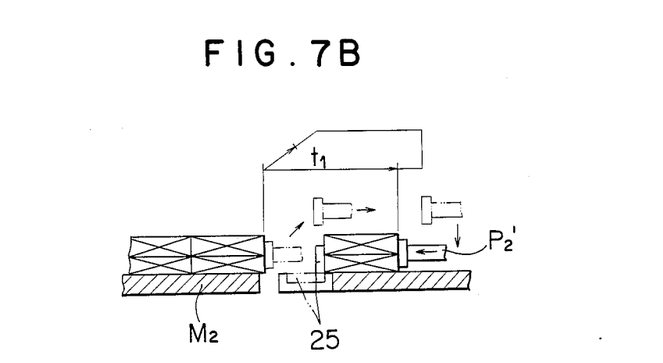
Figure 8A:
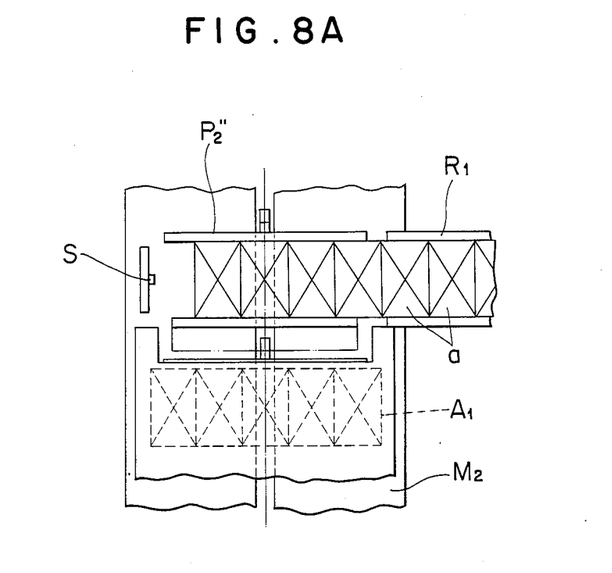
FIGS. 8A and 8B are a plan view and a sectional view of the product separating device of a further modified embodiment.
Figure 8B:
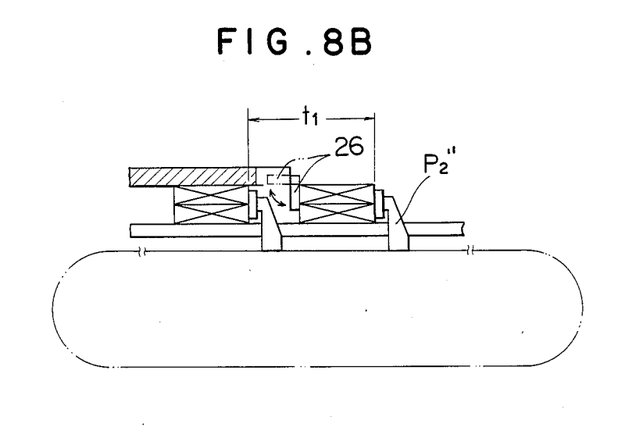
Figure 9A:
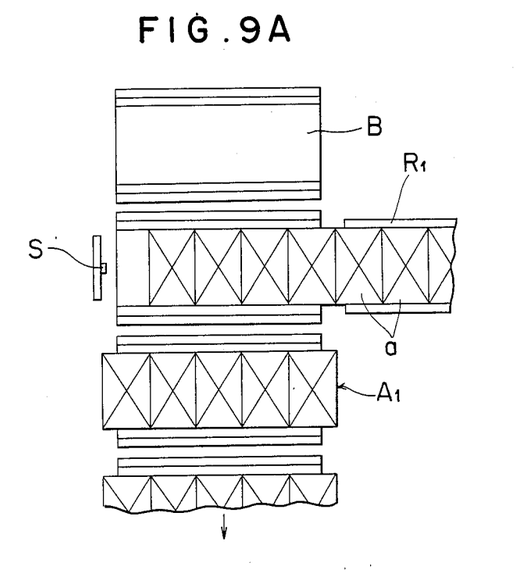
FIGS. 9A and 9B are a plan view and a sectional view of the product separating device of a still further modified embodiment.
Figure 9B:
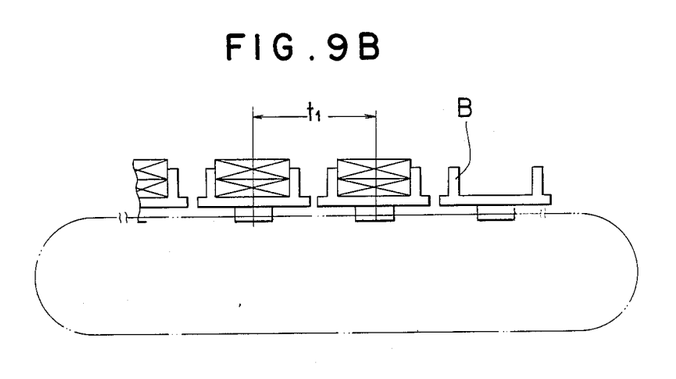

FIGS. 7 to 9 show another embodiments of the product separating device. As shown in FIG. 7, the product separating device comprises a pusher P2' designed to be reciprocated across the conveyance line R1, and a guide plate 25 normally biased by a spring in an upright direction and adapted to be pushed down upon advance of the pusher P2'.

As shown in FIG. 8, the product separating device comprises a pusher P2'' mounted to a conveyor member which is endlessly rotated in a fixed direction, and a guide plate 26 normally biased by a spring in a vertical position and adapted to be rotated to a horizontal position upon advance of the pusher P2''.

As shown in FIG. 9, the product separating device comprises a plurality of buckets B mounted on a conveyor member which is endlessly rotated in a fixed direction.

Although specific embodiments of the invention have been described, it will be appreciated that the invention is susceptible to modification, variation and change without departing from its proper scope as exemplified by the following claims.

What is claimed is:

1. A product supply system for intermittently feeding products to an accumulation packaging machine, said product supply system disposed between a product discharge section, having a predetermined product feeding speed, and a product inlet of said accumulation packaging machine, said product supply system comprising in sequence:

acceleration feeding means, having an axis extending in a first longitudinal direction and being receivable of products from said product discharge section, for receivably engaging and continuously transporting said products in said first longitudinal direction at a speed greater than said predetermined product feeding speed of said product discharge section to define a gap between a product received and transported by said acceleration feeding means and a succeeding product discharged at the product discharge section; and push conveyance means, having an axis extending in said first longitudinal direction and being receivable of products transported by said acceleration feeding means, for forming said products into a contiguous row-like arrangement extending in said first longitudinal direction and intermittently feeding a plurality of said products to said accumulation packaging machine in said contiguous row-like arrangement;

said push conveyance means comprising product guide means, operably connected to said acceleration feeding means, for slidably supporting products received from said acceleration feeding means and forming said products into a contiguous row-like arrangement, said product guide means having a first end adjacent said acceleration feeding means and a second end remote from said acceleration feeding means, said product guide means comprising at least one pair of horizontal parallel rails extending in said first longitudinal direction, each of said rails engaging at least a portion of a bottom face of a product supported thereon and each of said rails engaging an end face of a product supported thereon, at least a portion of one of said rails being horizontally movable toward and away from said other rail, said product guide means being supportable of a first plurality of said products in said contiguous row-like arrangement intermediate said first and second ends, said first plurality of said products comprising a second plurality of said products adjacent said second end of said product guide means and a third plurality of said products adjacent said first end of said product guide means, said second plurality of said products and said third plurality of said products being adjacent to one another, said product guide means and said acceleration feeding means cooperating to slide said products along said product guide means in response to the transport of products along said acceleration feeding means to said product guide means; product separating means, operably engageable of said second plurality of said products supported by said product guide means, for intermittently transporting said second plurality of said products in a direction transverse to said first longitudinal direction to said inlet of said accumulation packaging machine; and product retaining means, releasably engageable of said third plurality of said products supported on said product guide means, for temporarily holding said third plurality of said products in place to prevent sliding movement of said products along said product guide means, said product retaining means comprising said horizontally movable portion of said one of said rails and actuator means operably connected to said horizontal portion for moving said portion of said one of said rails in response to the intermittent operation of said product separating device, said actuator means comprising a shaft member, connected to said horizontally movable portion of said one of said rails, reciprocally movable in a horizontal direction toward and away from said other rail and having a cam follower thereon; support means for supporting said shaft member for reciprocal movement toward and away from said other rail; first biasing means for yieldably urging said shaft member toward said other rail; latch means, movable from a first position engaging said shaft member to a second position free of said shaft member, for preventing movement of said shaft member when in said first position and allowing movement of said shaft member when in said second position; second biasing means for yieldably urging said latch means to said first position; latch release means, operably connected to said accumulation packaging machine for reciprocal movement in a vertical direction between a third position and a fourth position and having a cam surface thereon engageable of said cam follower on said shaft member, for releasing said latch means upon movement from said third position to a fifth positoin, intermediate said third and fourth positions, and drawing said shaft member away from said other rail by engagement of said cam surface with said cam follower upon movement from said fifth position to said fourth position, whereby said latch means will re-engage said shaft member under the influence of said second biasing means, said product retaining means cooperating with said product separating means to prevent sliding movement of said products along said product guide means during operation of said product separating means, said acceleration feeding means having a drive source provided independently of said product discharge section and said product separating means.

2. The product supply system as claimed in claim 1, wherein said acceleration feeding means comprise a pair of endless conveyor belts, each having at least a portion of its length disposed substantially parallel to said first longitudinal direction; at least one pair of support rollers for each belt to support said belt for rotation thereabout; drive means for rotating each said belt about said corresponding at least one pair of support rollers in a direction such that said portions of said belts disposed substantially parallel to said first direction move in the same direction; wherein said support rollers are positioned such that said portions of said belts disposed substantially parallel to said first direction are substantially uniformly spaced apart in a horizontal plane.

3. The product supply system as claimed in claim 1, wherein said product separating means comprises raising means for raising said second plurality of products to a predetermined level and pusher means to push said raised products in a lateral direction, said raising means being adapted to swivel in a horizontal plane and to be lowered after swiveling.

4. The product supply system as claimed in claim 1, wherein said product separating means comprising a pusher designed to be reciprocated across said guide means, and said guide means includes a guide plate normally biased by a spring to an upright position and adapted to be pushed down upon advance of said pusher.

5. The product supply system as claimed in claim 1, wherein said product separating means comprises a pusher mounted to a conveyor member which is endlessly rotated transverse to said guide means, and said guide means includes a guide plate normally biased by a spring to a vertical position and adapted to be rotated to a horizontal position upon advance of said pusher.

6. The product supply system as claimed in claim 1, wherein said product separating means comprises a plurality of buckets mounted on a conveyor member which is endlessly rotated transverse to said guide means.

* * * * *